US008404145B2

(12) United States Patent
McGlashan-Powell et al.

(10) Patent No.: US 8,404,145 B2
(45) Date of Patent: Mar. 26, 2013

(54) METHOD FOR FORMING AN INDIUM CAP LAYER

(75) Inventors: Maurice McGlashan-Powell, Mount Vernon, NY (US); Eugene J. O'Sullivan, Nyack, NY (US); Daniel C. Edelstein, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 12/819,697

(22) Filed: Jun. 21, 2010

(65) Prior Publication Data
US 2010/0252775 A1    Oct. 7, 2010

Related U.S. Application Data

(62) Division of application No. 11/669,496, filed on Jan. 31, 2007, now Pat. No. 7,795,155.

(51) Int. Cl.
*C09K 13/04* (2006.01)

(52) U.S. Cl. ...................................... 252/79.2; 252/79.4

(58) Field of Classification Search .................. 252/79.1, 252/79.2, 79.4
See application file for complete search history.

(56) References Cited

U.S. PATENT DOCUMENTS

| 6,153,935 A | 11/2000 | Edelstein et al. |
| 6,358,832 B1 | 3/2002 | Edelstein et al. |
| 6,407,047 B1 * | 6/2002 | Mehta et al. ................... 510/254 |
| 6,943,451 B2 | 9/2005 | Whitehair et al. |
| 7,329,365 B2 * | 2/2008 | Cho et al. ........................ 216/83 |

FOREIGN PATENT DOCUMENTS

JP    55062181 A  *  5/1980

* cited by examiner

*Primary Examiner* — Roberts Culbert
(74) *Attorney, Agent, or Firm* — Connolly Bove Lodge & Hutz LLP; Vazken Alexanian, Esq.

(57) ABSTRACT

An indium cap layer is formed by blanket depositing indium onto a surface of metallic interconnects separated by interlayer dielectric, and then selectively chemically etching the indium located on the interlayer dielectric leaving an indium cap layer. Etchants containing a strong acid are provided for selectively removing the indium.

13 Claims, No Drawings

METHOD FOR FORMING AN INDIUM CAP LAYER

RELATED APPLICATION

This application is a division of co-pending application Ser. No. 11/669,496, filed on Jan. 31, 2007, and for which priority is claimed under 35 U.S.C. §120, the entire contents of which are hereby incorporated by reference.

DESCRIPTION

1. Technical Field

The present disclosure relates to a method for forming an indium cap layer. More particularly, the present disclosure relates to a method for forming an indium cap layer that does not require lithographic patterning. The present disclosure also relates to certain etchant compositions.

2. Background Art

Indium (In) has been suggested as an additive to Cu interconnects in order to improve corrosion resistance, electromigration properties, and dielectric adhesion. Being a low melting element, In readily interdiffuses with metals such as Cu, even at room temperature. In forms a protective oxide layer that imparts corrosion resistance, and serves as a good base layer to deposit the next dielectric layer in a multilayer microelectronic structure.

Indium may be selectively deposited by a chemical displacement process. However, an alternative process is to blanket deposit In on a substrate with interconnects already formed and to remove the unwanted In on the dielectric by a process involving lithographic patterning and subtractive etching. However, this is a difficult, expensive, and time consuming procedure.

SUMMARY OF DISCLOSURE

The present disclosure addresses problems associated with using patterning techniques. The present disclosure provides a method for forming an indium cap layer that does not require lithographic patterning.

The present disclosure relates to a method for forming a cap layer on a metallic surface such as a copper, nickel or gold surface which comprises providing a surface having metallic interconnects separated by interlayer dielectric; blanket depositing indium onto the surface; and then selectively chemically etching the indium located on the interlayer dielectric leaving an indium cap layer. The metallic surface employed forms an intermetallic layer with the indium.

Another aspect of the present disclosure relates to etchant compositions that comprise about 0.05 Molar to about 5 Molar of a strong acid having a pKa of about 3.5 or less; and about 0.001 Molar to about 0.5 Molar of an oxidant selected from the group consisting of vanadyl sulfate, persulfate salts and 3-nitrobenzenesulfonic acid, sodium salt.

Still other objects and advantages of the present disclosure will become readily apparent by those skilled in the art from the following detailed description, wherein it is shown and described only the preferred embodiments, simply by way of illustration of the best mode. As will be realized, the disclosure is capable of other and different embodiments, and its several details are capable of modifications in various obvious respects, without departing from the disclosure. Accordingly, the description is to be regarded as illustrative in nature and not as restrictive.

BEST AND VARIOUS MODES

The present disclosure relates to forming an indium cap layer on a copper surface. The method comprises providing a surface having copper interconnects separated by an interlayer dielectric (ILD). The copper interconnects can be copper and/or copper alloys such as CuAl alloys.

Suitable materials for the interlayer dielectric can include an organic or inorganic porous or non-porous material and particularly those materials having a low dielectric constant.

Typical organic materials include, but are not limited to, organic thermosets such as, for example, SILK, Flare, polyimides, polyarylene ethers, benzocyclobutenes and the like. The organic dielectric materials useful in forming the dielectric layer will ordinarily possess a dielectric constant less than about 3 and more typically from about 2 to about 2.7. The average pore size and size distribution of the porous materials will ordinarily range from about 1 to about 50 nm, with less than about 10 nm being even more typical.

Typical inorganic materials include, but are not limited to, materials containing silicon oxide and optionally containing one or more elements selected from C, H and F, e.g., FSG, C doped oxide, F doped oxide, alloys of Si, C, O and H, $SiO_2$, and the like. Specific examples include, but are not limited to, Black Diamond from Applied Materials, Coral from Novellus Systems, and a variety of spin applied films based on hydrogen silsesquioxane (HSQ), methyl silsesquioxane (MSQ), phenyl silsesquioxane and the like. Also, porous forms of these materials may be used, with the average pore size being from about 1 to about 50 nm and more typically less than about 10 nm. The inorganic dielectric materials will ordinarily possess a dielectric constant less than about 3.5 and more typically from about 2 to about 3.

The techniques and parameters for forming a surface having copper interconnects separated by interlayer dielectric are within the preview of one skilled in the art and need not be described herein in any detail.

Next indium is blanket deposited over the above surface. The techniques and parameters for blanket depositing indium are within the purview of one skilled in the art and need not be described herein in any detail. For instance, indium can be deposited by a standard sputtering process.

The thickness of the indium layer can vary over a wide range and is typically about 2 to about 40 nanometers and more typically about 5 to about 20 nanometers. Thicker indium layers are not especially preferred since they may cause undesirable increased interconnect resistance. The indium interdiffuses with the surface copper. This occurs at normal room temperatures. However, the speed of interdiffusion can be increased by increasing the temperature of the surface such as up to about 100° C. and more typically up to about 60° C.

Next, the indium from the ILD surface is removed by a chemical etch method. Moreover, since In exhibits a rather low standard electrochemical series potential, it readily forms an oxide film, the thickness of which may increase over time. Thus, any etchant selected for In must first be able to remove the passive In oxide layer prior to etching the underlying In metal. Dissolution of indium oxide may be represented as follows:

$$In_2O_3 + 6H_3O^+ + (2x-6)H_2O = 2[In(H_2O)_x]^{3+} \qquad (1)$$

This is a simplified representation of the dissolution of the passivating indium oxide layer. This is acid-promoted dissolution of indium oxide; no oxidant is required for this step. In practice, water molecules, atmospherically-derived contaminants, and In in the form of $In^+$, may be present in the film. Also, the kinetics of reaction (1) may change as the oxide film ages, or transforms into a more chemically stable crystalline structure depending on how the In layer is stored. This means that the etchant most desirably is capable of etching through a wide range of passive films on In.

Following dissolution of its passive film, In metal undergoes dissolution. This reaction may be depicted as either $$In + 3H_3O^+ (x-3)H_2O = [In(H_2O)_x]^{3+} + 1.5H_2 \quad (2)$$

or $$In + Oxid + xH_2O = [In(H_2O)_x]^{3+} + Red \quad (3)$$

where Oxid represents oxidant and Red represents reductant molecules or ions. Indium is shown undergoing dissolution to the +3 state; however, dissolution to the +1 state is also possible in either reaction. In reaction (2), because its electrochemical series potential (−0.33 V) is less than that of $H_2/H^+$ (0 V), it is capable of undergoing spontaneous dissolution in acid solution by reducing protons to hydrogen atoms on the In surface which combine to form hydrogen molecules ($H_2$), and ultimately generate hydrogen gas.

Though reaction (2) is expected to occur from the point of view of thermodynamics, as will be seen below, the kinetics for this process are slow, and hence it is not an especially efficient process for removing indium. Thus, an oxidant is desirable to achieve an improved process and to accelerate In dissolution through a more rapid parallel reaction as depicted in equation (3). Though not shown in equation (3), protons, or $H_3O^+$ ions, may also participate in the In dissolution process involving an oxidant.

According to certain aspects of the disclosure, the etchant composition contains a strong acid which desirably has a low pKa such as about 3.5 or less. Examples of strong acids are sulfuric acid, and perfluoroalkane sulfuric acids such as trifluoromethane sulfonic acid (TFMSA), trifluoroacetic acid and oxalic acid. The concentration of the strong acid is typically about 0.05 Molar to about 5 Molar and more typically about 0.25 to about 2 Molar.

The indium undergoes measurable dissolution in oxygen-gas-free acid solutions, but dissolved oxygen gas significantly enhances the rate of In etching. However, a disadvantage of such dissolved oxygen is that it etches Cu interconnects, thereby roughening the Cu surface and otherwise consuming Cu, and possibly leading to unwanted etching at grain boundaries. Etching of Cu interconnect structures proceeds at a faster rate than blanket Cu surfaces since the line width and via diameters are usually less than the diffusion-layer thickness of oxygen gas dissolved in solution. Thus, oxygen gas diffusion is more efficient to patterned Cu features due to such nonlinear diffusion.

It is therefore desirable to exclude oxygen gas from acid solutions that contact Cu-based interconnects. However, dissolved oxygen provides for enhanced rates of dissolution, another aspect of this disclosure is the inclusion of an oxidant that does not etch Cu to an undesirable extent.

Examples of oxidants that have been found to meet the above criteria are vanadyl sulfate ($VOSO_4$); persulfate salts such as sodium persulfate; and 3-nitrobenzenesulfonic acid, sodium salt.

When employed the oxidant is typically present in the etchant at a concentration of about 0.001 Molar to about 0.5 Molar and more typically about 0.005 Molar to about 0.07 Molar.

In addition, the etchant optionally contains a weak organic carboxylic acid such as having a pKa greater than about 4. The weak acid tends to suppress etching of the copper. Examples of a suitable carboxylic weak acid are adipic acid, succinic acid, acetic acid, butanoic acid, and glutaric acid.

When present, the weak organic carboxylic acid is typically present in the etchant with a concentration of about 0.02 Molar to about 1 Molar and more typically about 0.05 Molar to about 0.2 Molar.

The etchant is typically applied at temperatures of about minus 15° C. to about 50° C. and more typically about 20° C. to about 35° C.

The following non-limiting examples are presented to further illustrate the present disclosure.

EXAMPLE 1

A 20 nm layer of sputtered In on an oxidized Si wafer is immersed in an air-saturated, 1.8 molar aqueous solution of sulfuric acid at room temperature and with minimal, or occasional, hand agitation. After about 8 minutes, complete dissolution of the In occurs, indicating an etch rate of about 2.5 nm/min.

EXAMPLE 2

A 20 nm layer of sputtered In on an oxidized Si wafer is immersed in a nitrogen-gas-purged, 1.8 molar solution of sulfuric acid at room temperature. After about 60 minutes complete dissolution of the In occurs, indicating an etch rate of about 0.30-0.35 nm/min. The lower rate of In dissolution observed in this solution indicates that dissolved $O_2$ gas is effective in causing indium to dissolve. In the course of present run, the solution is vigorously agitated, and any trace of dissolved $O_2$ gas present thereby speeds up In dissolution. Thus, due to the likely effect of trace amounts of dissolved oxygen gas in this Example, the intrinsic etch rate of In in the sulfuric acid solution may be somewhat less than 0.3-0.35 nm/min.

EXAMPLE 3

A 100 nm layer of sputtered Cu is immersed in a nitrogen gas-purged, 1.0 molar solution of sulfuric acid containing about 5 g/l $VOSO_4$ at room temperature for about 1 hour. About 85-90 nm of Cu is dissolved in this period, yielding an etch rate of about 1.5 nm/min. In the same solution, a 20 nm layer of In on an oxidized Si wafer etchs in a period of about 5 sec.

EXAMPLE 4

A 100 nm layer of sputtered Cu is immersed in a nitrogen gas-purged, 1.0 molar solution of sulfuric acid containing about 5 g/l $VOSO_4$ and 0.1 molar solution of adipic acid at room temperature for about 2 hours and 25 minutes. About 30 nm of Cu is dissolved in this period, yielding a low etch rate of 0.2 nm/min. In the same solution, a 20 nm layer of In on an oxidized Si wafer etches in a period of about 5 sec.

EXAMPLE 5

A 100 nm layer of sputtered Cu is immersed in a nitrogen gas-purged, 1.0 molar solution of sulfuric acid containing about 5 g/l $VOSO_4$ and 0.1 molar solution of succinic acid at room temperature for about 2 hours and 15 minute. About 60 nm of Cu is dissolved in this period, yielding an etch rate of 0.4 nm/min. In the same solution, a 20 nm layer of In on an oxidized Si wafer etches in a period of about 5 sec.

EXAMPLE 6

A 100 nm layer of sputtered Cu is immersed in a nitrogen gas-purged, 1.0 molar solution of sulfuric acid containing about 5 g/l VOSO$_4$ and a 2 molar solution of acetic acid at room temperature for about 2 hours and 15 minutes. About 85 nm of Cu is dissolved in this period, yielding an etch rate of 0.6 nm/min. In the same solution, a 20 nm layer of In on an oxidized Si wafer etches in a period of about 5 sec. However, a disadvantage of acetic acid as an additive is its volatility.

EXAMPLE 7

A 20 nm layer of one-year old, sputtered In-coated back-end-of-line (BEOL) patterned Cu substrate is immersed in a nitrogen gas-purged, 1.0 molar solution of sulfuric acid containing about 5 g/l VOSO$_4$ and 0.1 molar solution of adipic acid at room temperature. The heavily-oxidized In layer is completely removed from the dielectric layer between the Cu conductors after a period of about 4 to 5 minutes.

EXAMPLE 8

A 20 nm layer of one-year old, sputtered In-coated back-end-of-line (BEOL) patterned Cu substrate is immersed in a nitrogen gas-purged, 0.1 molar solution of sulfamic acid containing about 0.5 g/l VOSO$_4$ at room temperature. The heavily-oxidized In layer is not completely removed from the dielectric between the Cu conductors after a period of 8 min.

EXAMPLE 9

A 20 nm layer of one-year old, sputtered In-coated back-end-of-line (BEOL) patterned Cu substrate is immersed in a nitrogen gas-purged, 0.1 molar solution of succinic acid containing about 0.5 g/l VOSO$_4$ at room temperature. The heavily-oxidized In layer showed no signs of removal from the dielectric after 10 minutes immersion in this solution. In contrast, a two-month-old sputtered blanket In layer on oxidized Si is etched completely in a time of about 3 minutes for an etch rate of about 7 nm/min.

EXAMPLE 10

XPS Analysis of Blanket-Deposited Indium on Silicon and Copper Wafers In order to determine the effectiveness of the indium selective etch, wafers of silicon and copper are coated with varying amount of indium and then etched. X-ray photoelectron spectroscopic (XPS) analysis of these wafers is performed to determine how effectively the etch removed indium from the silicon surface and to ensure that indium still remains on the copper surface. The results of this experiment clearly show the removal of all indium that is deposited onto the silicon surface and the continued presence of indium on the copper surface after 20 minutes of etching in the sulfuric acid, adipic acid and vanadyl sulfate solution.

EXAMPLE 11

Patterned Wafer Studies

Having shown the effectiveness of the selective etch on blanket copper and silicon wafers, blanket depositions of varying amounts of indium are applied to patterned wafers with copper feature size on the order of 190 nm. These wafers are then etched and subjected to electrical measurement that determine the sheet resistance, opens, and shorts yield for the interconnect networks. From these results the optimal thickness of deposited indium and etch time can be determined.

These measurements show that for 5 nm of deposited indium an etch time of 3 minutes is sufficient to remove all the indium between the copper line thus resulting in no shorts (95% yield) between the copper lines. Similarly the opens yield showed 100% of the circuits pass the opens test (no open circuits).

The sheet resistances of these copper lines are also measured and are shown to be in the acceptable range for M1 level copper interconnect.

AFM measurement are also made to ensure that there was no pitting of the copper due to the etching process.

The foregoing description illustrates and describes the disclosure. Additionally, the disclosure shows and describes only the preferred embodiments but, as mentioned above, it is to be understood that it is capable to use in various other combinations, modifications, and environments and is capable of changes or modifications within the scope of the invention concepts as expressed herein, commensurate with the above teachings and/or the skill or knowledge of the relevant art. The embodiments described herein above are further intended to explain best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended to the appended claims be construed to include alternative embodiments.

All publications and patent applications cited in this specification are herein incorporated by reference, and for any and all purposes, as if each individual publication or patent application were specifically and individually indicated to be incorporated by reference.

What is claimed:

1. A composition comprising about 0.05 Molar to about 5 Molar of a strong acid having a pKa of about 3.5 or less; and about 0.001 Molar to about 0.5 Molar of oxidant comprising vanadyl sulfate.

2. The composition of claim 1 wherein the concentration of the acid is about 0.25 Molar to about 2 Molar and the concentration of the oxidant is about 0.005 to 0.07 Molar.

3. The composition of claim 2 wherein further comprises about 0.02 to about 1 Molar of a weak organic carboxylic acid having a pKa of at least about 4.

4. The composition of claim 3 wherein the weak organic carboxylic acid comprises adipic acid.

5. The composition of claim 4 wherein the concentration of the adipic acid is about 0.05 to about 0.2 Molar.

6. The composition of claim 1 wherein the acid comprises sulfuric acid.

7. The composition of claim 6 wherein further comprises about 0.02 to about 1 Molar of a weak organic carboxylic acid having a pKa of at least about 4.

8. The composition of claim 7 wherein the weak organic carboxylic acid comprises adipic acid.

9. The composition of claim 8 wherein the concentration of the adipic acid is about 0.05 to about 0.2 Molar.

10. The composition of claim 1 wherein further comprises about 0.02 to about 1 Molar of a weak organic carboxylic acid having a pKa of at least about 4.

11. The composition of claim 10 wherein the weak organic carboxylic acid comprises adipic acid.

12. The composition of claim 10 wherein the concentration of the weak organic carboxylic acid is about 0.05 to about 0.2 Molar.

13. The composition of claim 12 wherein the weak organic carboxylic acid comprises adipic acid.

* * * * *